US009733542B2

(12) United States Patent
Bai

(10) Patent No.: US 9,733,542 B2
(45) Date of Patent: Aug. 15, 2017

(54) MULTI-SEGMENT MACH-ZEHNDER MODULATOR-DRIVER SYSTEM

(71) Applicant: Futurewei Technologies, Inc., Plano, TX (US)

(72) Inventor: Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/832,909

(22) Filed: Aug. 21, 2015

(65) Prior Publication Data

US 2016/0062207 A1    Mar. 3, 2016

Related U.S. Application Data

(60) Provisional application No. 62/041,544, filed on Aug. 25, 2014.

(51) Int. Cl.
| | |
|---|---|
| G02F 1/035 | (2006.01) |
| G02F 1/225 | (2006.01) |
| G02F 1/21 | (2006.01) |

(52) U.S. Cl.
CPC ............ *G02F 1/225* (2013.01); *G02F 1/2257* (2013.01); *G02F 2001/212* (2013.01)

(58) Field of Classification Search
CPC ... G02F 1/225; G02F 1/2257; G02F 2001/212
(Continued)

(56) References Cited

U.S. PATENT DOCUMENTS 6,650,458 B1 * 11/2003 Prosyk .................... G02F 1/225
                                                        359/237
7,155,072 B2 * 12/2006 Sugiyama ............. G02F 1/2255
                                                        385/1
(Continued)

FOREIGN PATENT DOCUMENTS

CN          101578544 A       11/2009
EP            1424591 A1        6/2004
(Continued)

OTHER PUBLICATIONS

Aoki, et al., "Single-Drive X-Cut Thin-Sheet LiNbO3 Optical Modulator with Chirp Adjusted Using Asymmetric CPW Electrode," Journal of Lightwave Technology, vol. 24, No. 5, May 2006, pp. 2233-2237.
(Continued)

*Primary Examiner* — Thomas A Hollweg
*Assistant Examiner* — Guy Anderson
(74) *Attorney, Agent, or Firm* — Conley Rose, P.C.

(57) ABSTRACT

An optical modulator comprising a waveguide for propagating an optical signal comprising a proximate arm configured to communicate a proximate portion of the optical signal, and a distal arm configured to communicate a distal portion of the optical signal, a proximate diode configured to modulate the proximate portion of the optical signal, a distal diode configured to modulate the distal portion of the optical signal, and an electrical input electrically coupled to opposite signed interfaces of the proximate diode and the distal diode such that an electrical driving signal propagated along the electrical input causes an equal and opposite modulation of the proximate portion of the optical signal in the proximate arm of the waveguide and the distal portion of the optical signal in the distal arm of the waveguide.

20 Claims, 6 Drawing Sheets

(58) Field of Classification Search
USPC .......................................................... 385/1–3
See application file for complete search history.

(56) References Cited

U.S. PATENT DOCUMENTS

| | | | | |
|---|---|---|---|---|
| 7,212,326 | B2* | 5/2007 | Wooten | G02F 1/225 359/237 |
| 7,483,597 | B2* | 1/2009 | Shastri | G02F 1/0123 359/237 |
| 7,978,390 | B2* | 7/2011 | Kikuchi | G02F 1/225 359/238 |
| 8,238,014 | B2* | 8/2012 | Kucharski | G02F 1/225 359/238 |
| 8,879,873 | B2* | 11/2014 | Goh | H04B 10/5161 385/3 |
| 2002/0071622 | A1 | 6/2002 | Betts et al. | |
| 2004/0201079 | A1 | 10/2004 | Scott et al. | |
| 2008/0089634 | A1* | 4/2008 | Mosinskis | G02F 1/0121 385/3 |
| 2012/0251032 | A1* | 10/2012 | Kato | G02F 1/0327 385/3 |
| 2013/0322809 | A1* | 12/2013 | Goh | H04B 10/5161 385/3 |
| 2014/0104666 | A1 | 4/2014 | Minoia et al. | |
| 2014/0212150 | A1 | 7/2014 | Welch et al. | |
| 2014/0355956 | A1* | 12/2014 | Yoneda | G06F 17/3028 386/248 |
| 2015/0063825 | A1* | 3/2015 | Yamase | H04B 10/5053 398/154 |
| 2015/0110500 | A1* | 4/2015 | Noguchi | G02F 1/0316 398/142 |

FOREIGN PATENT DOCUMENTS

| | | |
|---|---|---|
| EP | 2615490 A1 | 7/2013 |
| JP | 2014122964 A | 7/2014 |
| WO | 2013161196 A1 | 10/2013 |
| WO | 2014068197 A1 | 5/2014 |

OTHER PUBLICATIONS

Reed, et al., "Recent Breakthroughs in Carrier Depletion Based Silicon Optical Modulators," DOI 10.1515/nanoph-2013-0016, Nanophotonics 2013; Science Wise Publishing, 18 pages.

Samara-Rubio, et al., "Customized Drive Electronics to Extend Silicon Optical Modulators to 4 Gb/s," Journal of Lightwave Technology, vol. 23, No. 12, Dec. 2005, pp. 4305-4314.

Wooten, et al., "A Review of Lithium Niobate Modulators for Fiber-Optic Communications Systems," IEEE Journal of Selected Topics in Quantum Electronics, vol. 6, No. 1, Jan./Feb. 2000, pp. 69-82.

Foreign Communication From a Counterpart Application, PCT Application No. PCT/CN2015/087987, International Search Report dated Nov. 3, 2015, 8 pages.

Foreign Communication From a Counterpart Application, PCT Application No. PCT/CN2015/087987, Written Opinion dated Nov. 3, 2015, 5 pages.

Foreign Communication From a Counterpart Application, European Application No. 15836087.5, Extended European earch Report dated Jun. 9, 2017, 10 pages.

* cited by examiner

MULTI-SEGMENT MACH-ZEHNDER MODULATOR-DRIVER SYSTEM

CROSS-REFERENCE TO RELATED APPLICATIONS

The present application claims the benefit of U.S. Provisional Patent Application No. 62/041,544 filed Aug. 25, 2014, by Yu Sheng Bai, and entitled, "Multi-Segment Mach-Zehnder Modulator Driver System," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical modulators are devices for modulating electrical data signals onto an optical carrier to create an optical signal. The modulation of the optical carrier may be performed by manipulating a property of the optical carrier. Depending on which property of the optical carrier is manipulated, the optical modulators may be categorized into different types, for example, intensity modulators for modifying optical signal amplitude, phase modulators for modulating a phase of the optical carrier, polarization modulators for modifying a polarization of the optical carrier, and spatial light modulators for varying a spatial property of the optical carrier.

SUMMARY

In one embodiment, the disclosure includes an optical modulator comprising a waveguide for propagating an optical signal comprising a proximate arm configured to communicate a proximate portion of the optical signal, and a distal arm configured to communicate a distal portion of the optical signal, a proximate diode configured to modulate the proximate portion of the optical signal, a distal diode configured to modulate the distal portion of the optical signal, and an electrical input electrically coupled to opposite signed interfaces of the proximate diode and the distal diode such that an electrical driving signal propagated along the electrical input causes an equal and opposite modulation of the proximate portion of the optical signal in the proximate arm of the waveguide and the distal portion of the optical signal in the distal arm of the waveguide.

In another embodiment, the disclosure includes a single-drive multi-segment optical modulator system comprising an optical modulator comprising a plurality of electrical segment inputs, a proximate waveguide arm configured to communicate a proximate half of an optical signal, and a distal waveguide arm configured to communicate a distal half of an optical signal, and a plurality of modulator segments such that each modulator segment is configured to modulate a corresponding electrical segment input onto both the proximate waveguide arm and the distal waveguide arm, and a drive circuit electrically coupled to the optical modulator and comprising a plurality of drivers corresponding to the plurality of modulator segments such that each driver outputs an electrical segment signal to a single corresponding electrical segment input to control modulation by a single corresponding modulator segment.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
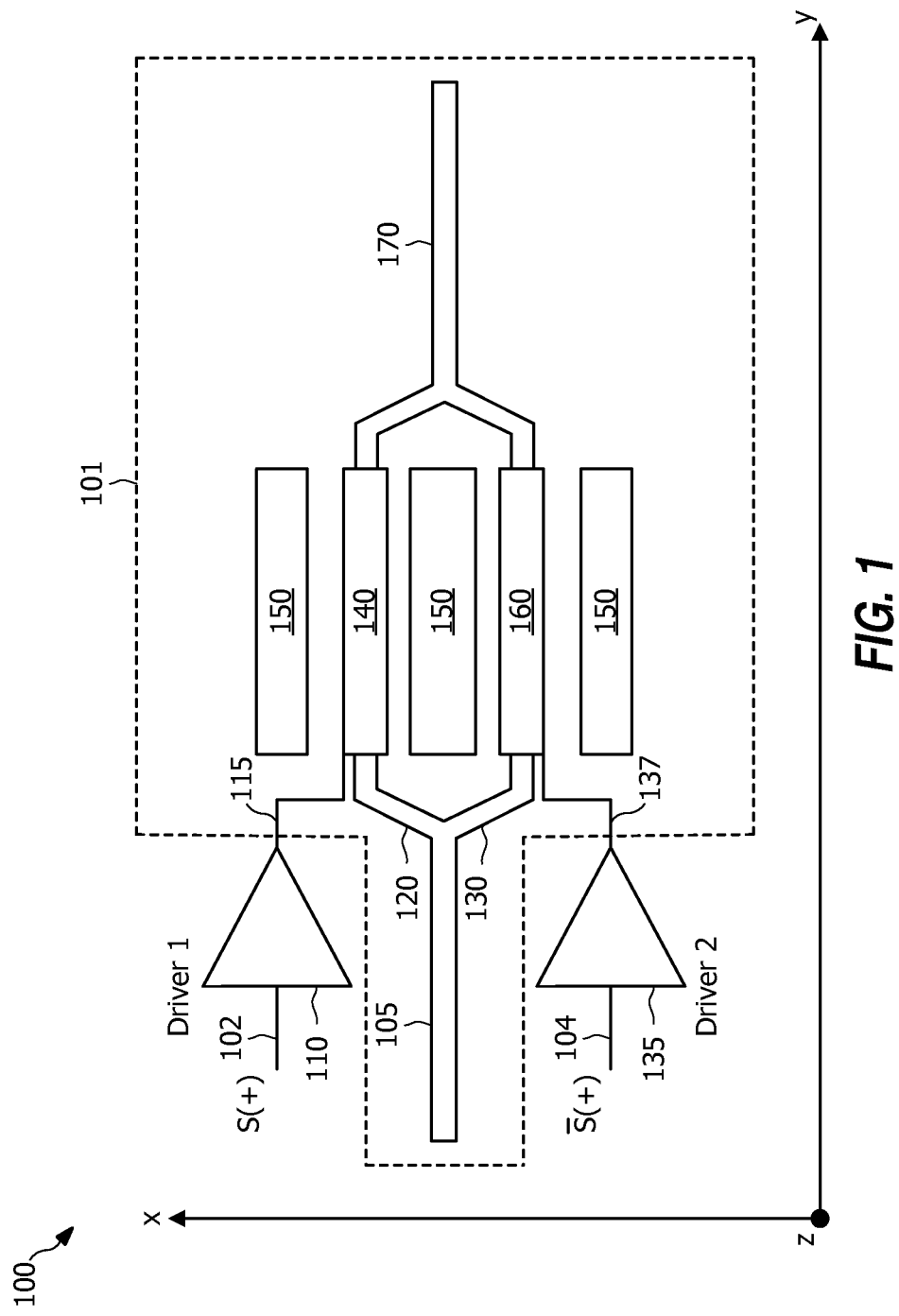
FIG. 1 is a schematic diagram of an embodiment of a Z-cut $LiNbO_3$ MZM-driver system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An optical modulator is a building block in optical communication systems. Optical modulators may be employed to enable optical systems for various applications, such as optical sensing, radio-frequency (RF) waveform generation for optical signal transmission, and optical signal processing. Among various optical modulators, Mach-Zehnder modulators (MZM) may be employed in optical communications. There are at least four parameters to characterize an optical modulator: $V_\pi$, insertion loss, modulation speed, and modulation efficiency. $V_\pi$ is a change in voltage required to achieve a $\pi$ phase shift in an optical signal. A small $V_\pi$ indicates that a small voltage induces a large phase shift, so an optical modulator with a small $V_\pi$ consumes relatively low power. Insertion loss is defined as the power loss due to the insertion of the optical modulator into a system and is proportional to the length of the optical modulator. Modulation speed corresponds to the maximum data rate of RF signals that the optical modulator can modulate onto the optical signal. Modulation efficiency indicates the rate of bits that can be encoded into a waveform and is inversely proportional to the product of $V_\pi$ and L, where L is the length of the optical modulator required to achieve a $\pi$ phase shift. In other words, a high modulation efficiency corresponds to a small product of $V_\pi$ and L.

Disclosed herein are various embodiments for single-drive multi-segment modulator-driver systems with high modulation efficiency. The disclosed embodiments comprise a drive IC and a multi-segment modulator. The optical modulator in any of the embodiments herein comprises silicon, Indium Phosphide (InP), Gallium Arsenide (GaAs), lithium niobate (LiNbO$_3$), or combinations thereof. The multi-segment modulator is suitable for high speed operations (e.g., >25 Gigabits per second (Gbps) modulation speed) and may be divided to a plurality of modulator segments. Each modulator segment may encode a portion of an electrical signal onto an optical carrier. Each modulator segment comprises a modulation element coupled to a proximate arm of an optical waveguide and a modulation element coupled to a distal arm of the optical waveguide. The proximate and distal arms are coupled together to allow modulated signal portions from both modulation elements in each modulation segment to be aggregated into a single optical signal. In an embodiment, the modulation elements are diodes (e.g. a proximate diode and a distal diode). A single electrical output from a single signal driver is coupled to each modulation segment. For example, the electrical output is coupled to a cathode of the proximate diode and to an anode of the distal diode, or vice versa. Since the diodes are electrically oriented in opposite directions (from the perspective of the driver), the electrical signal from the driver is applied to each waveguide arm in equal and opposite directions (e.g. different sign but same absolute value), which allows a single driver to replace a dual driver modulator system for each segment with no loss in modulation amplitude. By removing the extra driver, modulation properties for high speed applications can be achieved with reduced power, in a reduced space, with fewer components/lower product cost, etc. In an alternate embodiment, a single driver with two outputs may be employed for each modulation segment to double the modulation power applied to each waveguide arm without increasing the number of drivers.

FIG. 1 is a schematic diagram of an embodiment of a Z-cut LiNbO$_3$ MZM-driver system 100, where Z-cut indicates the polarization of crystals in the MZM is oriented in a Z-axis direction perpendicular to the surface as shown in FIG. 1. The Z-cut MZM-driver system 100 comprises a Z-cut MZM 101 and a pair of complementary drivers comprising a proximate driver 110, and a distal driver 135. Therefore, the Z-cut MZM 101 is sometimes referred to as a dual-drive MZM. The Z-cut MZM-driver system 100 may be configured as shown or in any other suitable manner. The Z-cut MZM 101 may be made of various materials. The materials may include ferroelectric or electro-optical crystals such as lithium niobate (LiNbO$_3$). The Z-cut MZM 101 comprises an input optical waveguide 105, a proximate arm waveguide 120, a distal arm waveguide 130, a proximate electrode 140 coupled to the proximate arm waveguide 120, a distal electrode 160 coupled to the distal arm waveguide 130, grounds 150, and an output waveguide 170.

The input optical waveguide 105 is configured to receive light and/or a modulated optical signal, communicate a proximate half/portion of the optical signal to the proximate arm waveguide 120, and communicate a distal half/portion of the optical signal to the distal arm waveguide 130, respectively. The proximate arm waveguide 120 is electrically coupled to the proximate electrode 140, and the distal arm waveguide 130 is electrically coupled to the distal electrode 160. The proximate arm waveguide 120 and the distal arm waveguide 130 are configured to communicate the proximate portion of the optical signal and the distal portion of the optical signal, respectively, across the electrodes 140 and 160, respectively, for modulation and on to the output waveguide 170. The output waveguide 170 is configured to aggregate the proximate portion of the optical signal and the distal portion of the optical signal and communicate the combined optical signal, for example for output to an external component such as another waveguide, a waveguide-fiber coupler coupled to an optical fiber, etc.

The proximate electrode 140 is coupled to the proximate driver 110. The proximate driver 110 is configured to receive a proximate RF signal 102, amplify the proximate RF signal 102 to create an amplified proximate RF signal 115, and electrically communicate the amplified proximate RF signal 115 to the proximate electrode 140. The proximate electrode 140 and the ground 150 are collectively configured to modulate the phase of the proximate portion of the optical signals by depleting free electrons in the proximate arm waveguide 120. Phase modulation of the proximate portion of the optical signals is implemented by applying the amplified proximate RF signal 115 on the proximate arm waveguide 120 to selectively deplete (e.g. depletion mode) or introduce free electrons (e.g. accumulation mode) into the proximate arm waveguide 120, thereby inducing changes of the refractive index of the proximate arm waveguide 120. The changes in the refractive index of the proximate arm waveguide 120 alters the speed of the optical signals propagating through the proximate arm waveguide 120, resulting in the phase modulation of the optical signals. The distal driver 135 receives and amplifies a distal RF signal 104 to create an amplified distal RF signal 137 and communicates the amplified distal RF signal 137 to the distal electrode 160 to modulate optical signals in the distal arm waveguide 130 in a substantially similar manner. Accordingly, the output of optical signals in the proximate arm waveguide 120 and the distal arm waveguide 130 can be combined into an optical output signal by independently operating the proximate driver 110 and the distal driver 135 using a push-pull operation.

The amplitude of the phase modulation of the proximate portion of the optical signals and the distal portion of the optical signals are positively proportional to the voltages of the amplified proximate RF signal 115 and the amplified distal RF signal 137, respectively, relative to grounds 150. The proximate RF signal 102 and the distal RF signal 104 have a phase difference of about 180 degrees. As a result, the phase modulations of the proximate portion of the optical signals and the distal portion of the optical signals have the same absolute values but different signs. In one embodiment, the proximate RF signal 102 and the distal RF signal 104 are generated by two different RF oscillators. In another embodiment, the proximate RF signal 102 and the distal RF signal 104 are generated by the same RF oscillator and one of the RF signals (e.g. the distal 104) experiences a phase shift of 180 degrees with respect to the proximate RF signal due to an RF shifter.

In operation, the optical signals are directed to the input optical waveguide 105 and split into the proximate portion and the distal portion. The proximate portion of the optical signals travels in the proximate arm waveguide 120 and experiences a proximate phase modulation. The distal portion of the optical signals is communicated in the distal arm waveguide 130 and experiences a distal phase modulation. The amplitudes of the proximate phase modulation and the distal phase modulation have the same absolute values but different signs. Then the proximate portion of the optical signals is combined with the distal portion of the optical signals at the output optical waveguide 170 for communication to an external component.

Figure 2:
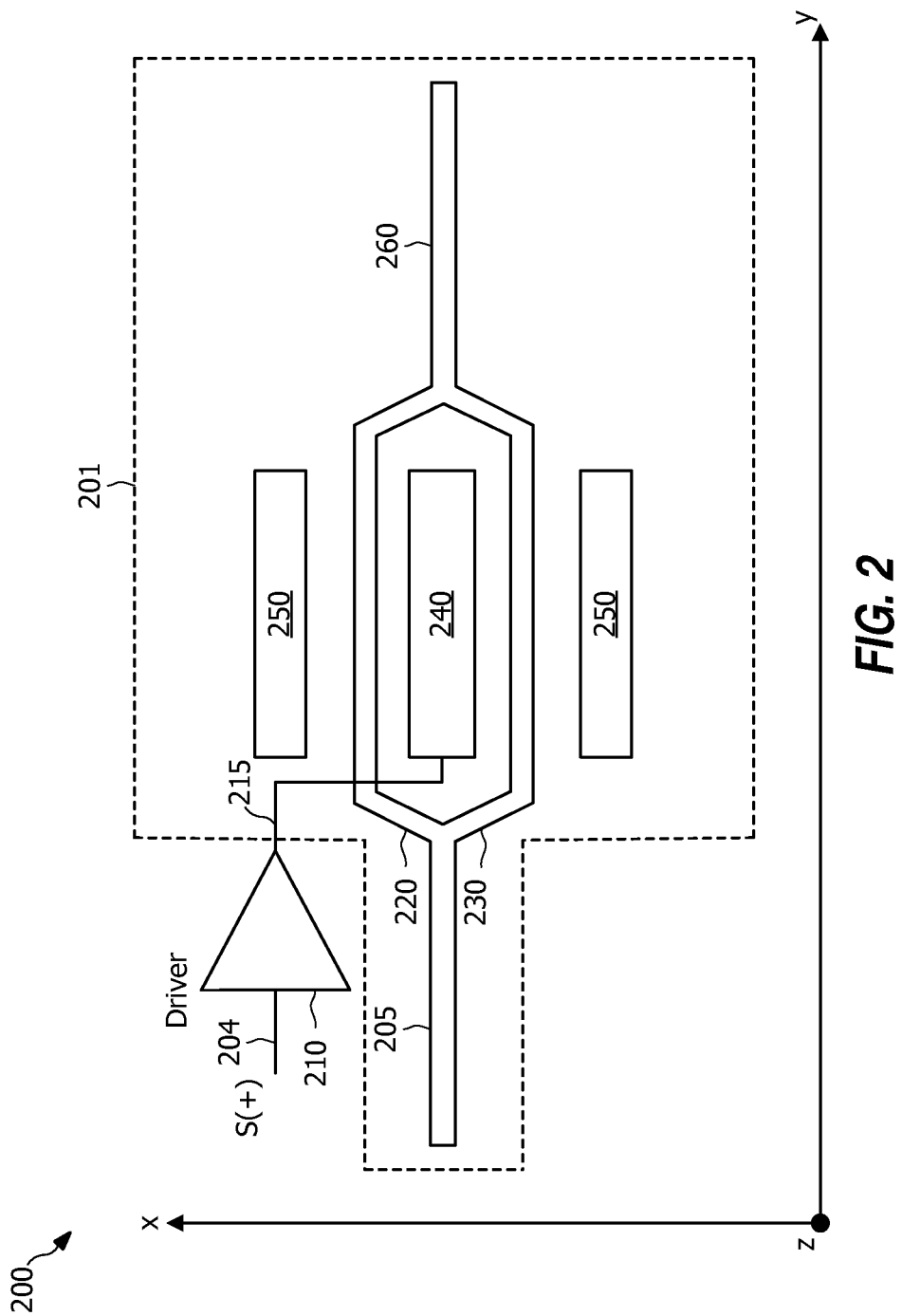
FIG. 2 is a schematic diagram of an embodiment of an X-cut $LiNbO_3$ MZM-driver system.

FIG. 2 is a schematic diagram of an embodiment of an X-cut LiNbO$_3$ MZM-driver system 200, where X-cut indicates the X-axis direction is perpendicular to the surface as shown in FIG. 2, while the Z-axis (the polarization of the crystal) is perpendicular to the optical waveguides. The X-cut MZM-driver system 200 comprises an X-cut MZM 201 and a driver 210. The driver 210 is similar to the proximate driver 110 and the distal driver 135. The X-cut MZM 201 is sometimes referred to as a single drive MZM. The X-cut MZM-driver system 200 may be configured as shown or in any other suitable manner. The X-cut MZM 201 may be substantially similar to Z-cut MZM 101 with a different crystal polarization and comprises an input optical waveguide 205, a proximate arm waveguide 220, a distal arm waveguide 230, grounds 250, and an output waveguide 260, which are similar to the input optical waveguide 105, the proximate arm waveguide 120, the distal arm waveguide 130, grounds 150, and the output waveguide 170, respectively.

The X-cut MZM 201 comprises an electrode 240, which is substantially similar to electrodes 140 and 160, but is positioned between the proximate arm waveguide 220 and the distal arm waveguide 230. The electrode 240 is electrically coupled to driver 210. The driver 210 receives RF signal 204, amplifies the signal to create an amplified RF signal 215, and applies the amplified RF signal 215, via the electrode 240, between the proximate arm waveguide 220 and the distal arm waveguide 230. The amplified RF signal 215 depletes or induces free electrons in the proximate arm waveguide 220 and the distal arm waveguide 230 between the electrode 240 and the grounds 250. The polarizations of crystals in the proximate arm waveguide 220 and the distal arm waveguide 230 are configured in opposite directions along the Z-axis resulting in equal and opposite behavior (e.g. depletion or introduction of free electrons) when the amplified RF signal 215 is applied to the electrode. For example, the phase shifts of the optical carrier portions that travel in the proximate arm waveguide 220 and the distal arm waveguide 230 have the same absolute values but different signs. As such, optical carriers traversing both the proximate arm waveguide 220 and the distal arm waveguide 230 can be controlled in a push-pull manner by a single driver 210. Accordingly, the X-cut MZM 201 generates the same amount of phase modulation as the Z-cut MZM 101 with fewer drivers given the same voltage and electro-optical coefficients. The benefits of the X-cut MZM-driver system 201 include simpler implementations, smaller total sizes of a whole driver-modulator system, and lower power consumptions.

In both the Z-cut MZM 101 and the X-cut MZM 201, the capacitances in the proximate arm waveguides 120 and 220 and the distal arm waveguides 130 and 230 are relatively large. As a result, the applications of the Z-cut MZM 101 and the X-cut MZM 201 at high speeds (e.g., >25 Gbps modulation speed) are limited, since the modulation speed is inversely proportional to the capacitances. In addition, the propagation velocity of the RF signals traveling in the MZMs are far slower than the propagation velocity of the optical signals due to the large capacitances per unit length, since the propagation velocity of the RF signals traveling in the MZM is inversely proportional to the square root of the capacitance per unit length.

Figure 3:
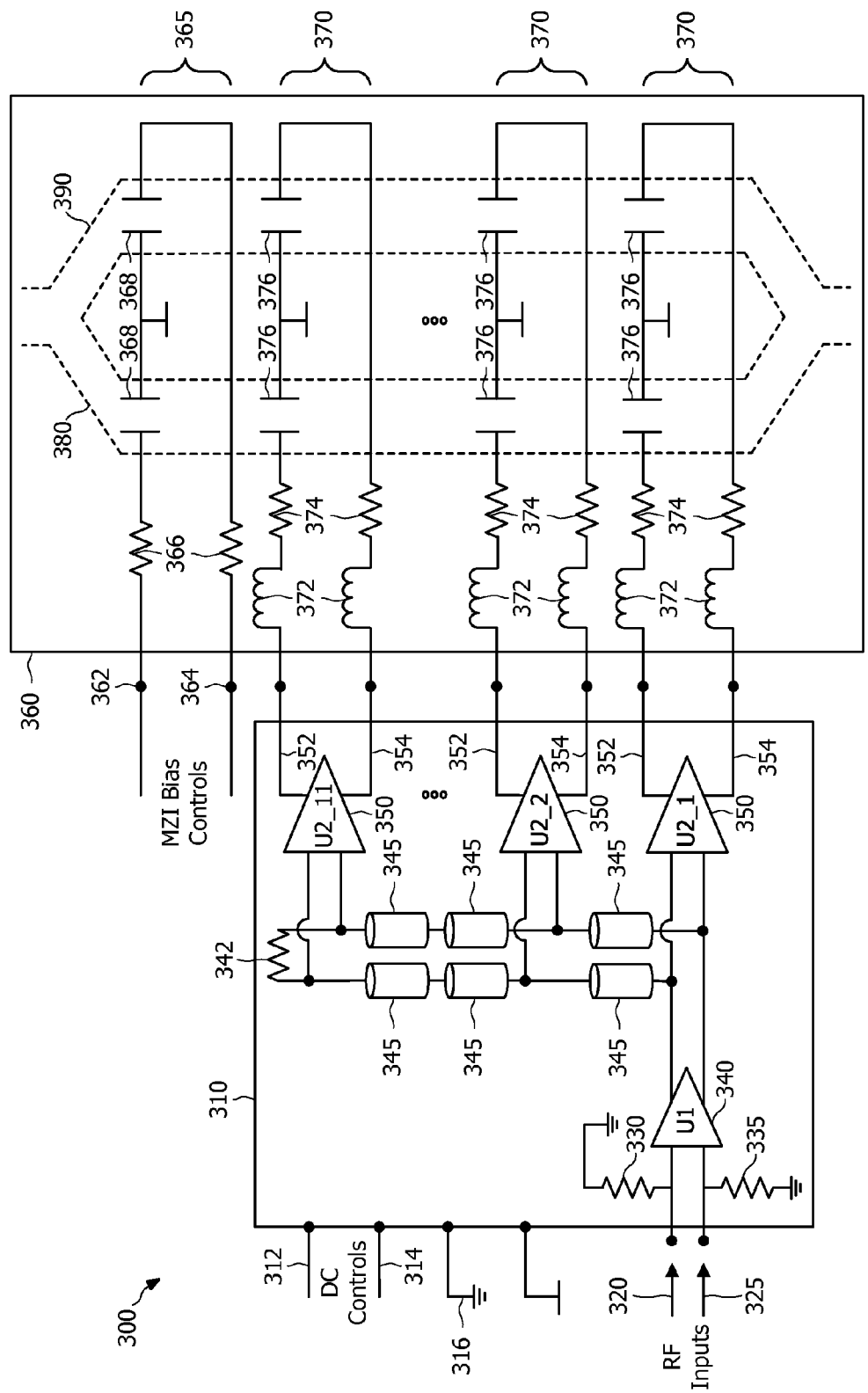
FIG. 3 is a schematic diagram of an embodiment of a dual-drive multi-segment MZM-driver system.

FIG. 3 is a schematic diagram of an embodiment of a dual-drive multi-segment MZM-driver system 300. The dual-drive multi-segment MZM-driver system 300 comprises a drive integrated circuit (IC) 310 and a multi-segment modulator 360. The dual-drive multi-segment MZM-driver system 300 can be configured as shown or in any other suitable manner. The dual-drive multi-segment MZM-driver system 300 employs a plurality of modulator segments 370, each with an aggregate capacitance that is substantially smaller than the capacitance of Z-cut MZM 101 and X-cut MZM 201. The modulator segments 370 are synchronized by introducing timing delay(s) to a proximate RF signal 320 and a distal RF signal 325 to account for propagation delays of an optical signal traversing the multi-segment modulator 360. As such, dual-drive multi-segment MZM-driver system 300 may be modulated at higher speeds than Z-cut MZM 101 and X-cut MZM 201.

The drive IC 310 comprises segment drivers 350 for each modulator segment 370, wherein the segment drivers 350 are electrically coupled via transmission lines 345. The segment drivers 350 each comprise a proximate output 352 and a distal output 354 (e.g. two drivers) that modulate a corresponding modulator segment 370 in a push-pull manner similar to proximate driver 110 and distal driver 135. The segment drivers 350 each generate a proximate output 352 and a distal output 354 by employing a proximate RF signal 320 and a distal RF signal 325 received via transmission lines 345 and input driver 340. The proximate RF signal 320 and the distal RF signal 325, are similar to the proximate RF signal 102 and the distal RF signal 104, respectively. The drive IC 310 employs input driver 340 to amplify the proximate RF signal 320 and the distal RF signal 325 as needed for transmission via transmission lines 345. Input driver 340 may operate in conjunction with grounded resistors 330 and 335 (e.g. 50 ohms (Ω) resistors) to perform impedance matching to prevent electrical characteristics of devices supplying the proximate RF signal 320 and the distal RF signal 325 from altering the electrical characteristics of drive IC 310. The transmission lines are coupled via resistor 342 to complete the circuit of the transmission lines 345. The drive IC 310 is coupled to a power source (e.g. a 5.2 volt (V) source) and a ground to receive operational power. The drive IC 310 is controlled via direct current (DC) controls 312 and 314 in the example shown. It should be noted that while eleven segment drivers 350 are shown, any number of segment drivers 350 can be employed to correspond with the number of modulator segments 370.

The multi-segment modulator 360 comprises a proximate arm waveguide 380 and a distal arm waveguide 390, which are similar to proximate arm waveguides 120 and 220 and distal arm waveguides 130 and 230, respectively. The proximate arm waveguide 380 and the distal arm waveguide 390 propagate an optical carrier via modulator segments 370 and a bias segment 365. Each modulator segment 370 comprises a pair of capacitors 376 positioned on or adjacent to each of the proximate arm waveguide 380 and the distal arm waveguide 390. Each capacitor 376 on the proximate arm waveguide 380 (e.g. the proximate capacitor) is electrically coupled to the proximate output 352 of the corresponding segment driver 350 and each capacitor 376 on the distal arm waveguide 390 (e.g. the distal capacitor) is electrically coupled to the distal output 354 of the corresponding segment driver 350. Accordingly, each capacitor 376 can deplete or augment the electrons in the corresponding waveguide arm 380/390 to modulate a portion/stage of the optical signal in a push-pull fashion in a manner similar to Z-cut MZM 101 based on the outputs of segment drivers 350. The modulator segments 370 further comprise inductors 372 and resistors 374 for conditioning the proximate output 352 and the distal output 354 sent to the capacitors 376. Each capacitor 376 is also coupled to a voltage source (or ground, depending on the embodiment) to manage depletion/augmentation across the waveguide arms. The bias segment 365 provides any needed corrective conditioning of the optical signal. The bias segment 365 comprises capacitors 368 for modulating the optical signal based on Mach-Zehnder Interferometer (MZI) bias controls 362 and 364, as well as resistors 366 for conditioning the MZI bias signals as needed. The MZI bias controls 362 and 364 modulate the optical signal in a manner substantially similar to modulator segments 370, but are employed for fine tuning of the modulated signal before the signal is aggregated for output.

In operation, the proximate RF signal 320 and the distal RF signal 325 are timed and propagated to each segment driver 350 and forwarded to each modulator segment 370 for modulation onto an optical carrier. As the optical carrier propagates along the waveguide arms 380 and 390, the optical carrier is modulated at each modulator segment 370. The proximate RF signal 320 and the distal RF signal 325 are timed so that the signals arrive at an appropriate modulator segment 370 at an appropriate point in time to match the velocity of the optical carrier, such that a complete modulated optical signal is received at the bias segment 365 for final aggregation and output. The multi-segment modulator 360 reduces the capacitance per segment compared to Z-cut MZM 101 and X-cut MZM 201, but requires dual segments drivers 350 for each modulator segment 370.

Figure 4:
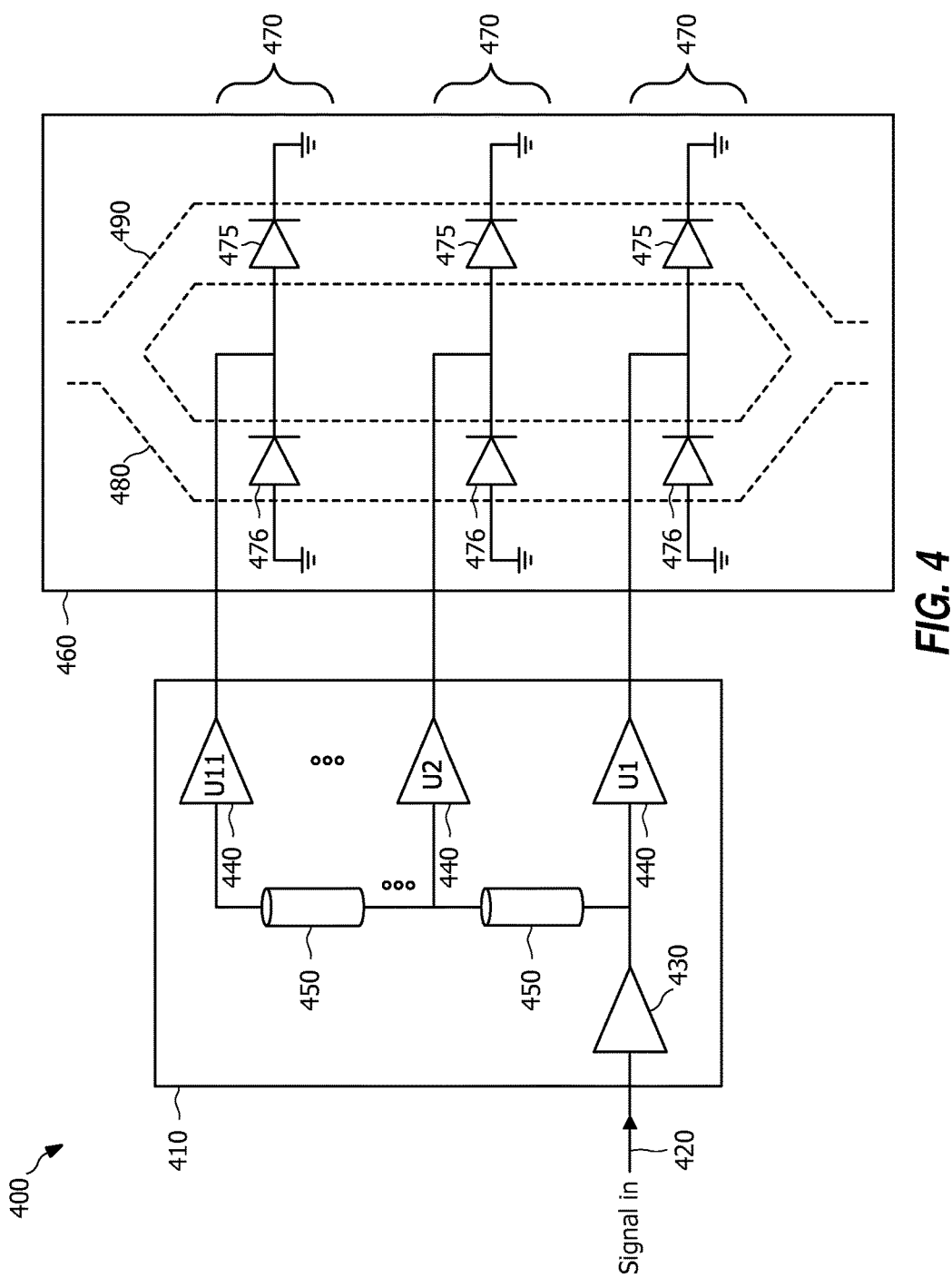
FIG. 4 is a schematic diagram of an embodiment of a single-drive multi-segment MZM-driver system.

FIG. 4 is a schematic diagram of an embodiment of a single-drive multi-segment MZM-driver system 400. The single-drive multi-segment MZM-driver system 400 operates in a manner similar to dual-drive multi-segment MZM-driver system 300, but employs a segment driver 440 for each modulator segment 470. The single-drive multi-segment MZM-driver system 400 may be employed for high speed operations (e.g. larger than 25 Gigahertz (GHz)), but requires less power and less complexity than system 300. The single-drive multi-segment MZM-driver system 400 is configured as shown, or in any other suitable manner, and comprises a drive IC 410 and a multi-segment modulator 460.

The drive IC 410 comprises an input driver 430, segment drivers 440, and a transmission line 450 for propagating an RF input signal 420, which are similar to input driver 340, segment drivers 350, and transmission lines 345, respectively. Drive IC 410 differs from drive IC 310 as drive IC 410 contains a single RF input signal 420 and a single segment driver 440 for each modulator segment 470 of the multi-segment modulator 460. Drive IC 410 may also comprise resistors/inductors for impedance matching, DC controls and/or a power supply as needed. While eleven segment drivers 440 are shown, any number of segment drivers 440 can be employed to correspond with the number of modulator segments 470. The segment drivers 440 may be implemented as complementary metal-oxide-semiconductor (CMOS) invertors, which consume relatively low power. Each segment driver 440 receives a single input and communicates a single output. A time delay between the segment drivers 440 for velocity matching with the optical signal is provided to transmission line 450 by the RF input signal 420. The delay can also be generated actively by one or more CMOS circuits. By selectively disabling the segment drivers 440 over time (e.g. output set to low or high), a multi-level optical signal, such as pulse amplitude modulation (PAM) can be generated, even if the outputs of the drivers 440 have only two electrical levels.

The multi-segment modulator 460 may be made of silicon, Indium Phosphide (InP), and/or or Gallium Arsenide (GaAs). The multi-segment modulator 460 comprises a proximate arm waveguide 480 and a distal arm waveguide 490, which are similar to proximate arm waveguide 380 and distal arm waveguide 390, respectively, modulated by a plurality of modulator segments 470 corresponding to the segment drivers 440. Each modulator segment 470 comprises a proximate diode 476 and a distal diode 475, positioned on/adjacent to the proximate arm waveguide 480 and the distal arm waveguide 490, respectively. The diodes 475 and 476 may also be referred to as positive-negative (p-n) diodes, and may act as voltage controlled variable capacitors. The diodes 475 and 476 may be oriented in with the same polarity as an X-cut MZM 201. The diodes 475 and 476 each comprise a negatively charged cathode and a positively charged anode. Each segment driver 440 may be coupled to the cathode of the proximate diode 476 and the anode of the distal diode 475, as shown in FIG. 4. Alternately, each segment driver 440 may be coupled to the anode of the proximate diode 476 and the cathode of the distal diode 475. In either case, the segment driver 440 is coupled to a negative portion of one diode and a positive portion of the other diode such that each diode in a segment pair has an opposite polarity with respect to the segment driver 440. The interface of each diode that is not coupled to a segment driver 440 may be coupled to a ground to support alternating current (AC) signals. DC isolation may be employed so that the diodes are biased at desired DC voltages. For example, DC isolation can be implemented by inserting large capacitors between each diode 475 and 476 and the respective ground. Because the polarity of the diode on each arm is aligned oppositely with each other in reference to the signal connection point, a driving signal results in an opposite phase shift, but in equal value, on each arm of the waveguide. As such, a single segment driver 440 generates the same amount depletion/accumulation (and hence modulation) on each waveguide arm as a pair of segment drivers 350. Accordingly, by coupling the segment drivers 440 to a pair of oppositely charged diodes 475 and 476, the number of transmission lines 450 and segment drivers 440 can be reduced by half when compared with dual-drive multi-segment MZM-driver system 300, while maintaining the same modulation power, optical signal amplitude, modulation speed, etc.

Figure 5:
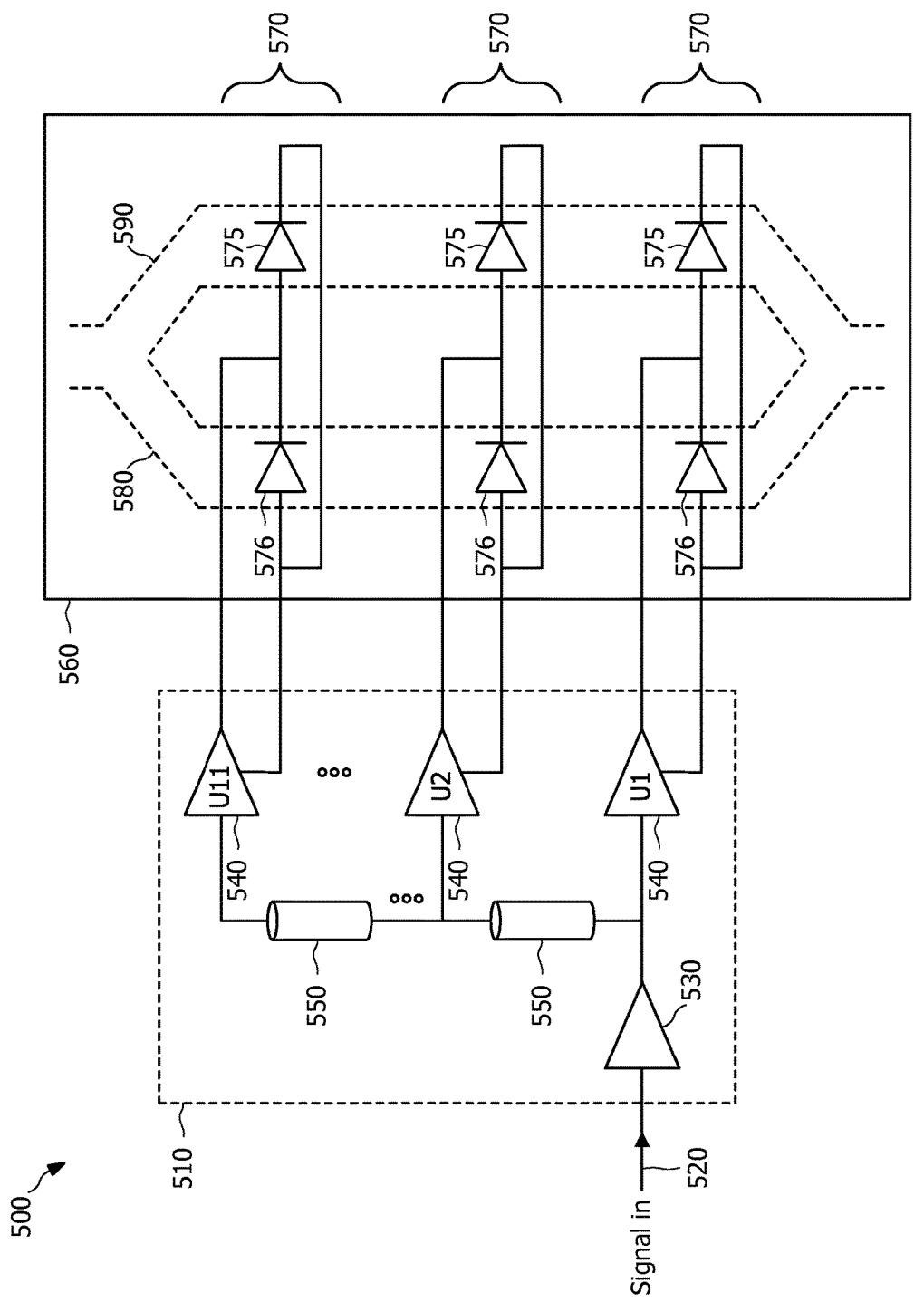
FIG. 5 is a schematic diagram of another embodiment of a single-drive multi-segment MZM-driver system.

FIG. 5 is a schematic diagram of another embodiment of a single-drive multi-segment MZM-driver system 500. The single-drive multi-segment MZM-driver system 500 is substantially similar to single-drive multi-segment MZM-driver system 400, but each segment driver 540 of the drive IC 510 employs both a primary output and a complementary output based on a single RF input signal 520 received via an input buffer 530 and a transmission line 550. The primary output is the same as the complementary output, but comprises an opposite electrical charge/sign. For example, if the primary output is about +0.5 volts, the complementary output is about −0.5 volts at the same time. The drive IC 510, the RF input signal 520, the input buffer 530, transmission line 550, and segment drivers 540, may otherwise be substantially similar to drive IC 410, RF input signal 420, input driver 430, transmission line 450, and segment drivers 440, respectively. The single-drive multi-segment MZM-driver system 500 may further comprise a multi-segment modulator 560 comprising a proximate arm waveguide 580, distal arm waveguide 590, and modulator segments 570 comprising distal diodes 575 and proximate diodes 576, which may be similar to multi-segment modulator 460, proximate arm waveguide 480, distal arm waveguide 490, modulator segments 470, distal diodes 475, and proximate diodes 476, respectively. The primary output of each segment driver 540 is coupled to the cathode of the proximate diode 576 and the anode of the distal diode 575 while the complementary output is coupled to the anode of the proximate diode 576 and the cathode of the distal diode 575, or vice versa (e.g. the primary output is coupled to different interfaces than the complementary output). By replacing the ground connections from modulator segments 470 with a complementary output, the effective driving voltage of each modulator segment 570 is doubled without increasing the number of segment drivers 540 or transmission lines 550. Similar to that in FIG. 4, DC isolations may be employed so that the diodes are biased at desired DC voltages. By doubling the voltage of the output to each modulator segment 570 a larger differential phase shift and thus higher modulation depth may be achieved resulting in greater modulation efficiency. Further, the length of the MZM may be shortened resulting in greater modulation efficiency.

Figure 6:
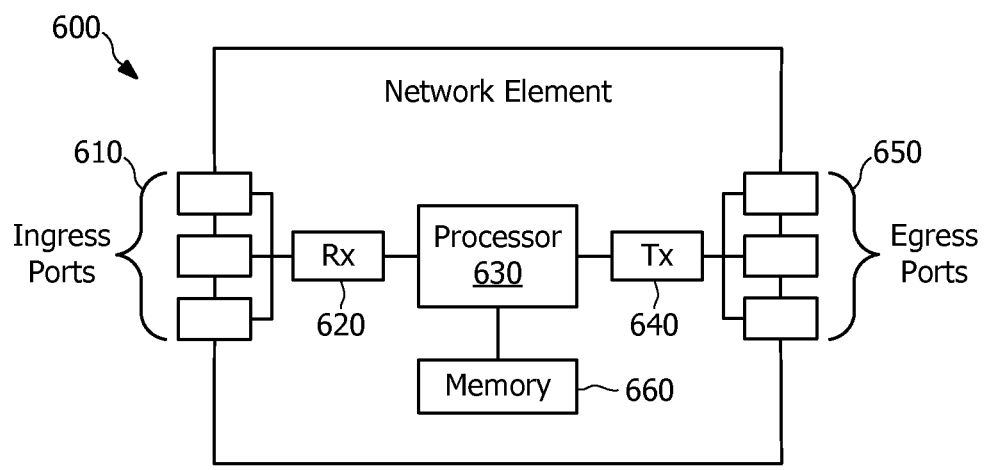
FIG. 6 is a schematic diagram of an embodiment of a network element (NE).

FIG. 6 is a schematic diagram of an embodiment of a network element (NE) 600. The NE 600 includes ingress ports 610 and receiver units (Rx) 620 for receiving data, a processor, logic unit, or central processing unit (CPU) 630 to process the data; optical transmitter units (Tx) 640 and egress ports 650 for modulating the data on optical signals and transmitting the optical signals; and a memory 660 for storing the data. The Tx 640 may comprise the single-drive multi-segment MZM-driver systems 400 and/or 500. The network element 600 may be configured as shown or in any other suitable manner.

The processor 630 is configured to process the data and is in communication with the ingress ports 610, receiver units 620, transmitter units 640, egress ports 650, and memory 660. The memory 660 includes one or more disks, tape drives, and solid-state drives and may be used as an overflow data storage device, to store programs when such programs are selected for execution, and to store instructions and data that are read during program execution. The memory 660 may be volatile and non-volatile and may be read-only memory (ROM), random-access memory (RAM), ternary content-addressable memory (TCAM), and static random-access memory (SRAM).

In some embodiments, the NE 600 is programmed to generate the proximate RF signal 102 and the distal RF signal 104. In some embodiments, the NE 600 is programmed to generate the RF signal 204. In some embodiments, the NE 600 is programmed to generate the proximate RF signal 320, the distal RF signal 325, the MZI bias controls 362 and 364, and the DC controls 312 and 314. In some embodiments, the NE 600 is programmed to generate the RF signal 420. In some embodiments, the NE 600 is programmed to generate the RF signal 520.

It is understood that by programming and/or loading executable instructions onto the NE 600, at least one of the processor 630 and/or memory device 660 are changed, transforming the NE 600 in part into a particular machine or apparatus, e.g. a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical modulator comprising:
   a waveguide for propagating an optical signal comprising:
      a proximate arm; and
      a distal arm; and
   a plurality of proximate diodes positioned along the proximate arm of the waveguide and a plurality of distal diodes positioned along the distal arm of the waveguide, wherein the plurality of proximate diodes are configured to modulate a proximate portion of the optical signal, wherein the plurality of distal diodes are configured to modulate a distal portion of the optical signal, wherein one of the plurality of proximate diodes and one of the plurality of distal diodes form a proximate diode and distal diode pair,
   wherein each proximate diode and distal diode pair is coupled to a primary output of a segment driver such that the primary output of the segment driver is coupled to a first interface of a proximate diode and a second interface of a distal diode of each proximate diode and distal diode pair, and wherein the first interface of the proximate diode and the second interface of the distal diode are opposite signed interfaces.

2. The optical modulator of claim 1, wherein each proximate diode and distal diode pair is further coupled to a complementary output of the segment driver, such that the complementary output is coupled to a second interface of the proximate diode and a first interface of the distal diode of each proximate diode and distal diode pair, and wherein the second interface of the proximate diode and the first interface of the distal diode are opposite signed interfaces.

3. The optical modulator of claim 2, wherein the segment driver coupled to each proximate diode and distal diode pair is a single driver.

4. The optical modulator of claim 2, wherein the primary output and the complementary output of the segment driver provide a common signal with opposite electrical signs, and wherein the proximate portion of the optical signal in the proximate arm of the waveguide and the distal portion of the optical signal in the distal arm of the waveguide are modulated in equal value and opposite phase.

5. The optical modulator of claim 4, wherein the segment driver is a single driver.

6. The optical modulator of claim 1, wherein the primary output of the segment driver is electrically coupled to a cathode of the proximate diode and an anode of the distal diode.

7. The optical modulator of claim 1, wherein the primary output of the segment driver is electrically coupled to an anode of the proximate diode and a cathode of the distal diode.

8. The optical modulator of claim 1, wherein the optical modulator comprises silicon, Indium Phosphide (InP), Gallium Arsenide (GaAs), lithium niobate (LiNbO3), or combinations thereof.

9. A single-drive multi-segment optical modulator system comprising:
   an optical modulator comprising:
      a proximate waveguide arm configured to communicate a proximate half of an optical signal;
      a distal waveguide arm configured to communicate a distal half of the optical signal; and
      a plurality of modulator segments such that each modulator segment is configured to modulate a corresponding electrical signal input onto both the proximate waveguide arm and the distal waveguide arm, wherein each modulator segment comprises a proximate diode positioned across the proximate waveguide arm and a distal diode positioned across the distal waveguide arm, wherein the proximate diode and the distal diode of each modulator segment forms a proximate diode and distal diode pair; and
   a drive circuit electrically coupled to the optical modulator and comprising a plurality of drivers corresponding to the plurality of modulator segments such that each driver of the plurality of drivers comprises a primary output configured to provide a primary electrical signal to the corresponding modulator segment,
   wherein each proximate diode and distal diode pair is coupled to the primary output of the driver such that the primary output of the driver is coupled to a first interface of a proximate diode and a second interface of a distal diode of each proximate diode and distal diode pair, and wherein the first interface and the second interface of each of the proximate diode and the distal diode are opposite signed interfaces.

10. The system of claim 9, wherein each driver of the plurality of drivers further comprises a complementary output configured to provide a complement electrical signal to the corresponding modulator segment such that the complementary output of the driver is coupled to a second interface of the proximate diode and a first interface of the distal diode of each proximate diode and distal diode pair, and wherein each complement electrical signal comprises an equivalent amplitude and opposite charge to a corresponding primary electrical signal.

11. The system of claim 10, wherein the second interface of the proximate diode and the first interface of the distal diode of each proximate diode and distal diode pair are opposite signed interfaces.

12. The system of claim 11, wherein each complement electrical signal is coupled to different oppositely polarized interfaces than the corresponding primary electrical signal.

13. The system of claim 12, wherein each complement electrical signal is coupled to an anode of a corresponding proximate diode and a cathode of a corresponding distal diode, and wherein each primary electrical signal is coupled to a cathode of the corresponding proximate diode and an anode of the corresponding distal diode.

14. The system of claim 12, wherein each complement electrical signal is coupled to a cathode of a corresponding proximate diode and an anode of a corresponding distal diode, and wherein each primary electrical signal is coupled to an anode of the corresponding proximate diode and a cathode of the corresponding distal diode.

15. The system of claim 9, wherein the optical modulator comprises silicon, Indium Phosphide (InP), Gallium Arsenide (GaAs), lithium niobate (LiNbO3), or combinations thereof.

16. The system of claim 9, wherein the driver provides direct current signals.

17. The system of claim 9, wherein the driver provides alternating current signals.

18. A method of optical modulation, comprising
   propagating, by a waveguide of an optical modulator, an optical signal by:
      modulating, by a plurality of proximate diodes positioned along a proximate arm of the waveguide, a proximate portion of an optical signal; and
      modulating, by a plurality of distal diodes positioned along a distal arm of the waveguide, a distal portion of the optical signal,
   wherein one of the plurality of proximate diodes and one of the plurality of distal diodes form a proximate diode and distal diode pair,
   wherein each proximate diode and distal diode pair is coupled to a primary output of a segment driver such that the primary output of the segment driver is coupled to a first interface of a proximate diode and a second interface of a distal diode of each proximate diode and distal diode pair, and
   wherein the first interface of the proximate diode and the second interface of the distal diode are opposite signed interfaces.

19. The method of claim 18, wherein each proximate diode and distal diode pair is further coupled to a complementary output of the segment driver, such that the complementary output of the segment driver is coupled to a second interface of the proximate diode and a first interface of the distal diode of each proximate diode and distal diode pair, and wherein the second interface of the proximate diode and the first interface of the distal diode are opposite signed interfaces.

20. The method of claim 19, further comprising providing, by the primary output and the complementary output of the segment driver, a common signal with opposite electrical signs.

* * * * *